United States Patent [19]
Kirby

[11] Patent Number: 4,639,819
[45] Date of Patent: Jan. 27, 1987

[54] PROTECTIVE BYPASS FOR ELECTRONIC CIRCUITS

[75] Inventor: David Kirby, Emmaus, Pa.

[73] Assignee: Lutron Electronics Co., Inc., Coopersburg, Pa.

[21] Appl. No.: 637,862

[22] Filed: Aug. 6, 1984

[51] Int. Cl.$^4$ ............................................. H01R 31/08
[52] U.S. Cl. ..................... 361/115; 339/19; 339/242; 339/263 R; 361/355
[58] Field of Search ................ 361/115, 355; 339/19, 339/22, 22 B, 242, 263 R

[56] References Cited

U.S. PATENT DOCUMENTS

| | | | |
|---|---|---|---|
| 2,030,522 | 2/1936 | Johansson | 175/123 |
| 3,243,663 | 3/1966 | Rowe | 361/355 |
| 3,644,870 | 2/1972 | Jones | 339/45 M |
| 3,728,656 | 4/1973 | Neuber | 336/147 |
| 3,805,206 | 4/1974 | Ege | 337/9 |
| 3,806,857 | 4/1974 | Hubeny | 339/19 |
| 3,831,129 | 8/1974 | Frey | 339/19 |
| 3,860,314 | 1/1975 | Vandiveer et al. | 339/18 R |
| 3,909,097 | 9/1975 | Roth et al. | 339/19 |
| 4,144,554 | 3/1979 | Erickson | 361/355 |
| 4,412,715 | 11/1983 | Bogese, II | 339/97 P |

Primary Examiner—A. D. Pellinen
Assistant Examiner—Jeffrey A. Gaffin
Attorney, Agent, or Firm—Ostrolenk, Faber, Gerb & Soffen

[57] ABSTRACT

A protective bypass circuit for optionally shortcircuiting the output lugs of a plurality of circuit breakers. The bypass circuit includes a plurality of lug plates, each having first and second sections. The first section of each lug plate is received in and clamped by an output lug of a respective circuit breaker. A plurality of lead wire clamping elements are electrically coupled to the first section of a respective lug plate and are adapted to releasably clamp a lead wire thereto. A shorting bus bar is releasably coupled to the second sections of the lug plates.

20 Claims, 8 Drawing Figures

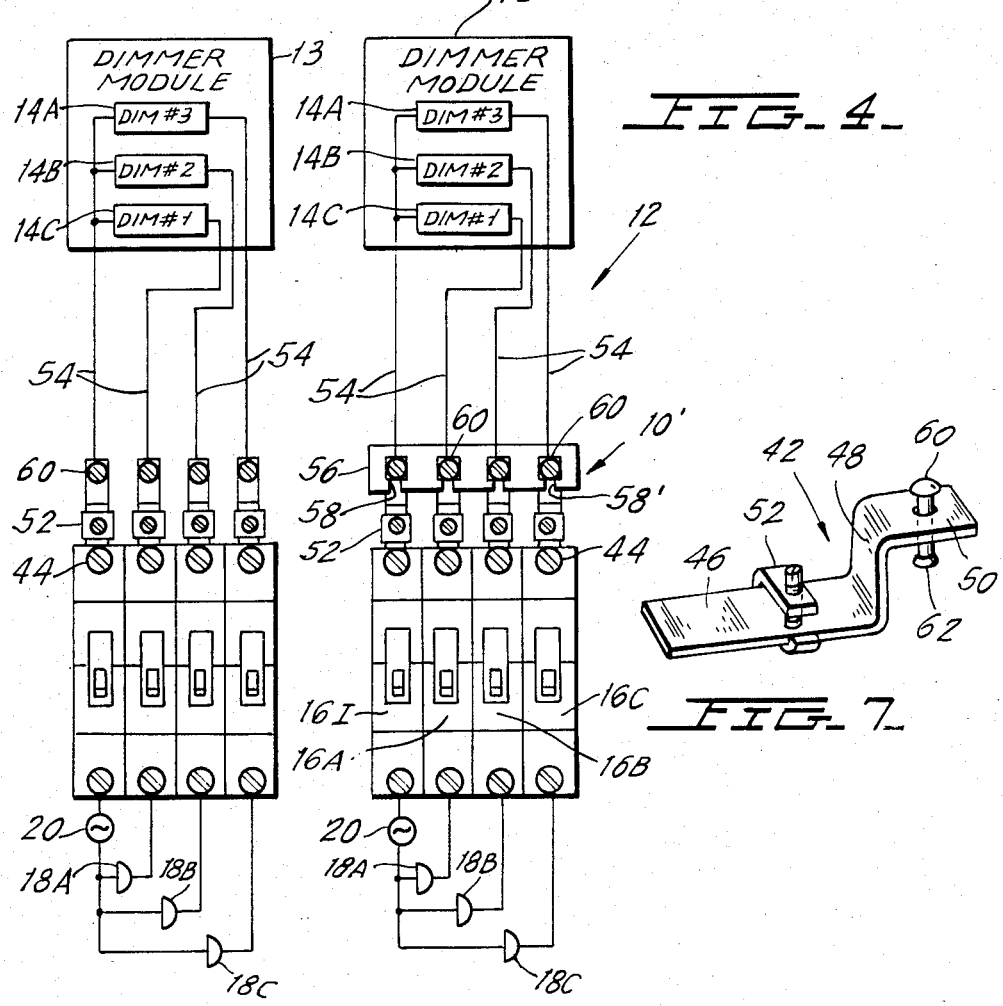
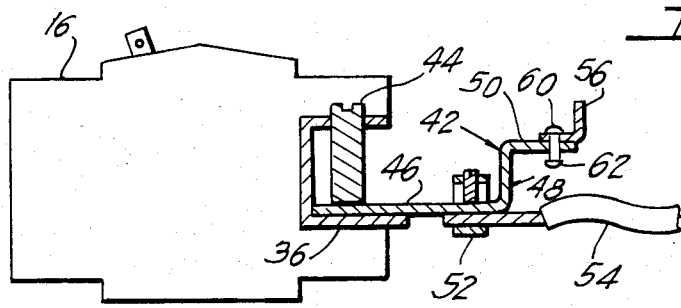

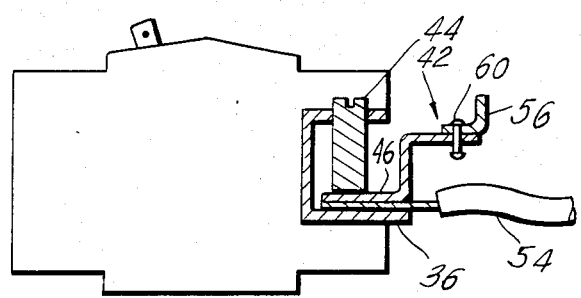
FIG_7.

PROTECTIVE BYPASS FOR ELECTRONIC CIRCUITS

BACKGROUND OF THE INVENTION

The present invention is directed towards a protective bypass for electronic circuits and, more particularly, to a bypass which enables a plurality of circuit breakers to be shortcircuited to one another when the circuit breakers are first connected to an electrical circuit being protected.

Circuits of the foregoing type are generally known. A prior art circuit sold by Lutron Electronics Co., Inc., the assignee of the present invention, is illustrated in FIGS. 1-3. As shown therein, a bypass circuit 10 is connected to a lighting circuit 12 which includes a dimmer module 13 including three dimmer circuits 14A, 14B and 14C (hereinafter referred to generally as dimmer circuits 14), a bank of circuit breakers 16a, 16b and 16c (hereinafter referred to generally as circuit breakers 16) and a plurality of loads 18A, 18B and 18C (hereinafter referred to generally as loads 18) typically fluorescent or incandescent lamps. The dimmer circuits 14A, 14B and 14C are connected to loads 18A, 18B and 18C via circuit breakers 16A, 16B and 16C, respectively. The remaining ends of each load 18 is connected to an a.c. power source 20 which, in turn, is connected to the common circuit breaker 16I. The remaining end of the circuit breaker 16I is connected to the dimmer circuits 14A-14C so as to form a closed circuit. So connected, each dimmer circuit 14A-14C will control the amount of power applied to its respective load 18A-18C in a manner well known in the art. Each of the load circuit breakers 16A-16C will trip whenever the current in its associated load 18A-18C exceeds a predetermined value so as to protect the load from overcurrents. In a similar manner, input circuit breaker 16I will trip whenever the main current to the dimmer circuits 14A-14C exceeds a predetermined value.

When initially wiring the light circuit 12, it is desirable to protect the dimmer circuits 14 against miswiring or shortcircuits since the dimmer circuits are relatively expensive. This is accomplished by providing a bypass circuit 10 which directly connects the input circuit breaker 16I to each of the load circuit breakers 16A, 16B and 16C. This shorts or bypasses the dimmer circuits 14 but still ensures that the circuit breakers are available to protect the loads 18.

As best shown in FIGS. 1 and 2, the prior art bypass circuit 10 includes a plurality of terminal blocks 22A, 22B and 22C (hereinafter referred to generally as blocks 22) each of which selectively shortcircuits the input circuit breaker 16I to a respective one of the load circuit breakers 16A, 16B and 16C. Each terminal block 22 is formed by a pair of insulative housings 24 having lugs 26, 28 formed at opposite ends thereof. Each pair of lugs 26, 28 formed in the same insulative housing 24 are electrically coupled to one another. As best shown in FIG. 2, each lug 26 includes a set screw 30 which can be used to retain a conductive bypass circuit wire 34 in mechanical and electrical contact with the conductive lug 26. A similar set screw 32 is provided for each lug 28.

As best shown in FIGS. 1 and 3, the rightmost insulative housing 24 of each terminal block 22 is coupled to the circuit breaker lug 36 of input circuit breaker 16I while the leftmost insulative housing 24 of each terminal block 22 is connected to the circuit breaker lug 36 of a respective load circuit breaker 16A, 16B, 16C. The remaining lugs 28 of each pair of insulative housings 24 defining a respective terminal block 22 are shortcircuited by a U-shaped jumper 40. As best shown in FIG. 3, a respective set screw 44 associated with each lug 36 releasably holds both a bypass circuit wire 34 and a dimmer module wire 54 in the lug 36. So connected, the terminal blocks 22A, 22B and 22C shortcircuit the input circuit breaker 16I to each of the load circuit breakers 16A, 16B and 16C, respectively. This protests the dimmer circuits 14A, 14B and 14C against miswires and shortcircuits and at the same time ensures that the circuit breakers 16 protect the loads 18.

While the foregoing circuitry provides adequate protection for the dimmer circuits 14, it is disadvantageous in that it requires a significant amount of space and labor. Additionally, since separate wires 34, 54 are provided to connect the circuit breakers 16 to the dimmer module 13 and to connect the circuit breakers 16 to the bypass circuit 10, and since the separate wires terminate at the same circuit breaker lugs 36, it is not possible to remove the dimmer module 13 to repair or replace it without disrupting the bypass wiring.

BRIEF DESCRIPTION OF THE INVENTION

In an effort to overcome the drawbacks of the prior art, the protective bypass circuit of the present invention comprises:

a plurality of lug plates each having first and second sections, said first section of each lug plate being received in and clamped by an output lug of a respective circuit breaker;

a plurality of lead wire clamping elements, each said clamping element being electrically coupled to said first section of respective said lug plate and adapted to releasably clamp a lead wire thereto;

a shorting bus bar; and means for releasably coupling said shorting bus bar to said second section of each of said lug plates.

In the presently preferred embodiment, the lug plates include a stepped section located between the first and second sections to ensure that the bus bar is located remotely from the lead wires. The clamping elements are defined by box lugs which include a set screw which enable the lead wires to be connected to or disconnected from the lug plates. The releasable coupling means include a respective clamping screw coupled to the second section of each of the lug plates. The shorting bus bar has screw receiving openings formed therein at locations corresponding to the locations of the clamping screws and is releasably coupled to the lug plates via the clamping screws. The bus bar is preferably L-shaped so as to make it easier to grip and be removed from the lug plates.

In accordance with an alternative embodiment of the present invention, the protective bypass circuit comprises:

a plurality of lug plates each having first and second sections, said first section of each lug plate being received in and clamped by an output clamp of a respective circuit breaker;

a shorting bus bar; and means for releasably coupling said shorting bus bar to said second section of each of said lug plates.

In the foregoing embodiment, the output lug of the circuit breakers serves to releasably clamp a lead wire of an electrical circuit being protected by the circuit breakers.

BRIEF DESCRIPTION OF THE DRAWINGS

For the purpose of illustrating the invention, there is shown in the drawings two embodiments which are presently preferred, it being understood, however, that the invention is not limited to the precise arrangements and instrumentalities shown.

FIG. 4 is a schematic diagram of a lighting circuit employing the bypass circuit of the present invention.

FIG. 5 is a schematic diagram of the circuit of FIG. 4 after a shorting bus bar forming part of the bypass circuit of the present invention has been removed.

FIG. 6 is a side view, partially in section, of one of the circuit breakers of FIG. 4 and the portion of the bypass circuit of the present invention associated therewith.

FIG. 7 is a perspective view illustrating a single stepped lug plate forming part of the bypass circuit of the present invention.

FIG. 8 is a side view, partially in section, of one of the circuit breakers of FIG. 4 and a portion of the bypass circuit constructed in accordance with a second embodiment of the present invention.

DETAILED DESCRIPTION OF THE INVENTION

Figure 1:
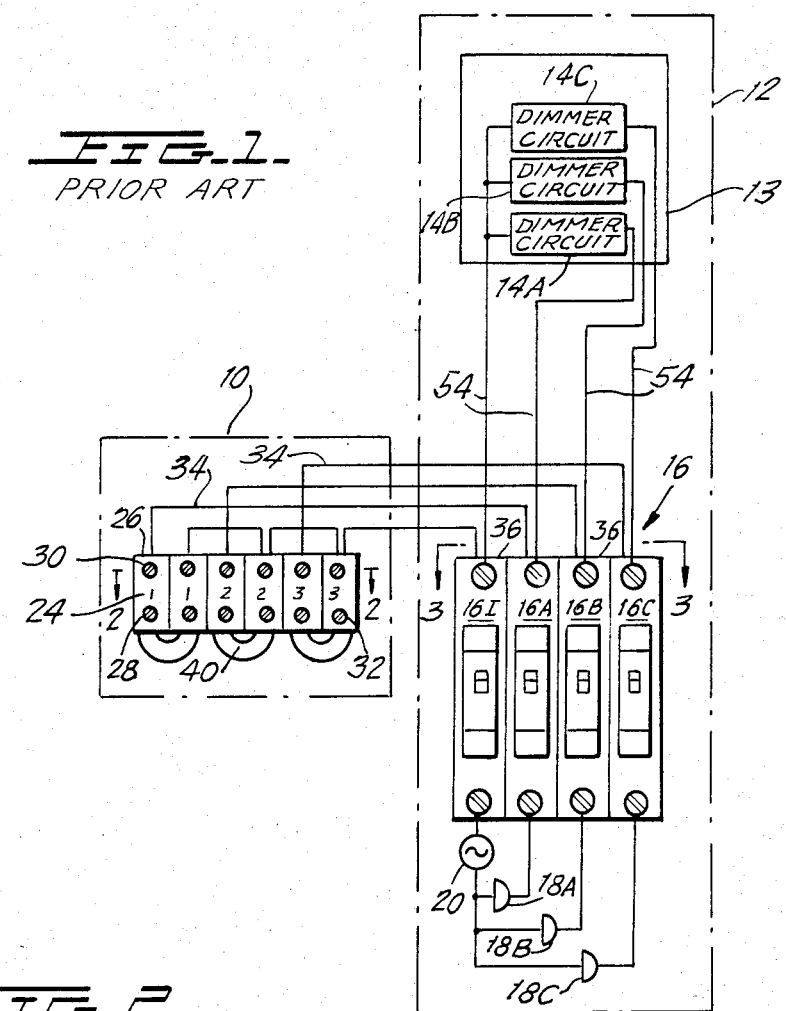
FIG. 1 is a schematic diagram illustrating the manner in which a bypass circuit of the prior art is connected to a lighting circuit.
Figure 2:
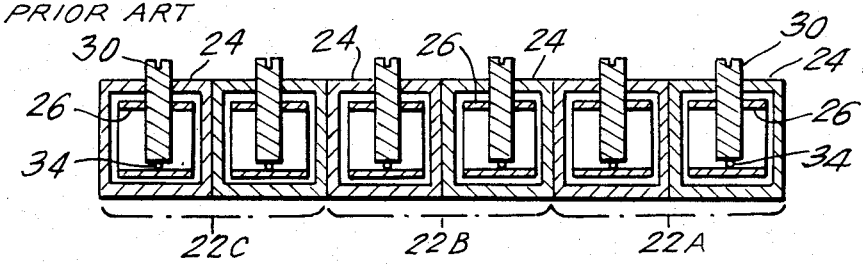
FIG. 2 is a cross-sectional view taken along lines 2—2 of FIG. 1.
Figure 3:
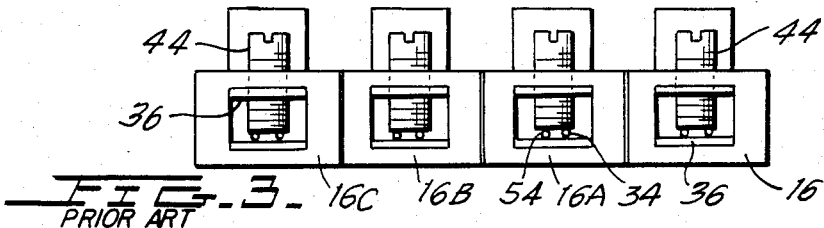
FIG. 3 is a side view of the circuit breakers of FIG. 1 taken along lines 3—3.

Referring now to FIGS. 4-7, the presently preferred embodiment of the bypass circuit 10' of the present invention will be described. The bypass circuit 10' is illustrated in connection with a light circuit 12 which is identical to the lighting circuit of FIG. 1. Those elements of FIGS. 4-6 which correspond to FIG. 1 are identified by like numerals.

As best shown in FIGS. 4, 6 and 7, bypass circuit 10' includes a plurality of stepped, conductive lug plates 42, each lug plate 42 being received in a respective circuit breaker lug 36 of the circuit breakers 16I, 16A, 16B and 16C. Each lug plate 42 includes a lower section 46, a stepped section 48 and an upper section 50. The lower section 46 extends into the respective lug 36 and is held in place by the set screw 44 associated with the lug.

A box lug 52 is fitted to the lower section 46 at a position outside of the circuit breaker 16 and maintains a respective control circuit wire 54 in physical and electrical contact with the lug plate 42 and, therefore, with the respective circuit breaker 16. Since the box lug 52 is located externally to the circuit breaker 16 and since it makes it possible to connect and disconnect the control wire 54 to the circuit breaker 16 without disconnecting the lug plate 42 from the circuit breaker 16, the control circuit wires 54, and, therefore, the dimmer circuits 14, can selectively be connected to or disconnected from the circuit breakers 16 without disconnecting the bypass circuit 10'.

The bypass circuit 10' also includes a conductive bus bar 56 which has a plurality of screw receiving grooves 58 formed therein at locations corresponding to clamping screws 60 which are located on the upper section 50 of respective lug plates 42. Each of the clamping screws 60 is formed with an enlarged section 62 at the bottom thereof which prevents the screws 60 from being accidentally separated from the lug plates 42.

When the lighting circuit 12 is first wired, or when it is desired to replace any of the dimmer circuits 14, the bus bar 56 is placed in the position illustrated in FIG. 4 so as to shortcircuit each of the load circuit breakers 16A, 16B and 16C to the input circuit breaker 16I. To this end, the clamping screws 60 are loosened, the bus bar 56 is placed in contact with the lug plates 42 such that the grooves 58 formed in the bus bar 56 each receive a respective clamping screw 60 and the clamping screws 60 are tightened to maintain the bus bar 56 in place. In this position, the bus bar 56 defines a bypass circuit between the input circuit breaker 16I and the load circuit breakers 16A, 16B and 16C so that no load current flows through the dimmer circuits 14.

Once the dimmer circuits 14 have been properly connected to the circuit breakers 16, the clamping screws 60 are loosened and the bus bar 56 is removed to attain the configuration illustrated in FIG. 5. In this configuration, the leftmost lug plate 42 is connected to the input end of dimmer circuits 14A, 14B and 14C and the remaining lug plates 42 are connected to the outputs of dimmers 14A, 14B and 14C, respectively.

As best illustrated in FIG. 6, the provision of a step in the lug plate 42 ensures that the bus bar 56 is located in a different plane than the control wires 54. This makes it easier to connect and disconnect the bus bar 56 without interfering with the wires 54. The bus bar 56 is preferably L-shaped to enable the operator to easily grip the bus bar without interference from the screws 60.

As should be apparent from the foregoing, the bypass circuit 10' of the present invention overcomes the above noted problems of the prior art in that it takes up substantially no additional room beyond that required for the circuit breakers 16, is inexpensive to manufacture and is easy to install. Additionally, the bypass circuit 10' of the present invention makes it possible to disconnect the dimmer circuits 14 from the circuit breakers 16 without disabling the bypass circuit.

FIG. 7 illustrates a second embodiment of the bypass circuit of the present invention. This embodiment is identical to that of FIGS. 3-6 with the exception that the box lug 52 has been removed and the lower section 46 of the lug plate 42 has been shortened. In this embodiment, each respective control circuit wire 54 is releasably held in physical and electrical contact with the circuit breaker lug 36 by the set screw 44.

In the embodiments described above, a separate lug plate 42 is provided for each circuit breaker 16. In the event that the number of dimmer circuits 14 are less than the number of load circuit breakers 16, two or more circuit breakers will typically be connected in parallel to each other and will be connected to a single dimmer circuit. For example, if a single dimmer circuit 14A were provided in the dimmer module 13, the load lugs 36 of the load circuit breakers 16A, 16B and 16C would be connected to one another in parallel and the single parallel connection would be connected to the right end of the dimmer 14A. In such configuration, only a pair of lug plates 42 need be provided for circuit breaker 16I and 16A and the bus bar 56 may be cut in half so as to only extend between those two lug plates. Other configurations could also be used.

The present invention may be embodied in other specific forms without departing from the spirit or essential attributes thereof and, accordingly, reference should be made to the appended claims, rather than to the foregoing specification, as indicating the scope of the invention.

What is claimed is:

1. A protective bypass circuit optionally shortcircuiting the lugs of a plurality of circuit breakers, said bypass circuit comprising:
   a plurality of lug plates each having first and second sections, said first section of each lug plate being received in and clamped by a lug of a respective circuit breaker;
   a plurality of lead wire clamping elements, each said clamping element being electrically coupled to said first section of a respective said lug plate and adapted to releasably clamp a lead wire thereto;
   a shorting bus bar; and
   means for releasably coupling said shorting bus bar to said second section of each of said lug plates.

2. The protective bypass circuit of claim 1, wherein each of said lug plates includes a stepped portion located between said first and second sections.

3. The protective bypass circuit of claim 2, wherein said first and second sections are planar and are located in respective planes.

4. The protective bypass circuit of claim 3, wherein said respective planes are parallel to but spaced from each other.

5. The protective bypass circuit of claim 1, wherein each of said clamping elements is defined by a respective box lug.

6. The protective bypass circuit of claim 5, wherein each of said box lugs is mechanically coupled to said first section of its lug plate.

7. The protective bypass circuit of claim 1, wherein said releasably coupling means comprise a plurality of clamping screws, each clamping screw being threadably received in said second section of a respective said lug plate.

8. The protective bypass circuit of claim 7, wherein each said clamping screw includes means for preventing said screw from being removed from its respective lug plate.

9. The protective bypass circuit of claim 7, wherein said shorting bus bar is an elongated bar having a plurality of screw receiving grooves formed therein, each of said grooves being formed at a location corresponding to a different one of said clamping screws.

10. The protective bypass circuit of claim 9, wherein said bus bar has an L-shaped cross-section.

11. The protective bypass circuit of claim 1, wherein one of said circuit breakers is an input circuit breaker and the remaining said circuit breakers are load circuit breakers, and wherein said protective bypass circuit is coupled to one or more dimmer circuits, an input end of each of said dimmer circuits being electrically connected to said input circuit breaker, an output end of each of said dimmer circuits being connected to said load circuit breakers.

12. A protective bypass circuit optionally shortcircuiting the lugs of a plurality of circuit breakers, said bypass circuit comprising:
   a plurality of lug plates each having first and second sections, said first section of each lug plate being received in and clamped by a lug of a respective circuit breaker;
   a shorting bus bar; and
   means for releasably coupling said shorting bus bar to said second section of each of said lug plates.

13. The protective bypass circuit of claim 12, wherein each of said lug plates includes a stepped portion located between said first and second sections.

14. The protective bypass circuit of claim 13, wherein said first and second sections are planar and are located in respective planes.

15. The protective bypass circuit of claim 13, wherein said respective planes are parallel to but spaced from each other.

16. The protective bypass circuit of claim 12, wherein said releasably coupling means comprises a plurality of clamping screws, each clamping screw being threadably received in said second section of a respective said lug plate.

17. The protective bypass circuit of claim 16, wherein each said clamping screw includes means for preventing said screw from being removed from its respective lug plate.

18. The protective bypass circuit of claim 16, wherein said shorting bus bar is an elongated bus bar having a plurality of screw-receiving grooves formed therein, each of said grooves being formed at a location corresponding to a different one of said clamping screws.

19. The protective bypass circuit of claim 18, wherein said bus bar has an L-shaped cross-section.

20. The protective bypass circuit of claim 12, wherein one of said circuit breakers is an input circuit breaker and the remaining said circuit breakers are load circuit breakers, and wherein said protective bypass circuit is coupled to one or more dimming circuits, an input end of each of said dimmer circuits being electrically connected to said input circuit breaker, and an output end of each of said dimmer circuits being connected to said lug of one or more of said load circuit breakers.

* * * * *